(12) United States Patent
Miyayama

(10) Patent No.: US 7,671,934 B2
(45) Date of Patent: Mar. 2, 2010

(54) DISPLAY DEVICE AND DISPLAY DEVICE STAND

(75) Inventor: Manabu Miyayama, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/244,598

(22) Filed: Oct. 2, 2008

(65) Prior Publication Data

US 2009/0122219 A1    May 14, 2009

(30) Foreign Application Priority Data

Nov. 13, 2007    (JP) .............................. 2007-294720

(51) Int. Cl.
*G02F 1/1333*    (2006.01)
(52) U.S. Cl. .............................. 349/58; 349/59; 349/60
(58) Field of Classification Search .............. 349/58–60
See application file for complete search history.

(56) References Cited

FOREIGN PATENT DOCUMENTS

| JP | 11095866 | 4/1999 |
|---|---|---|
| JP | 2002-006763 | 1/2002 |
| JP | 2003312374 | 11/2003 |
| JP | 2004169901 | 6/2004 |
| JP | 2005075175 | 3/2005 |
| JP | 3130612 | 3/2007 |
| JP | 2007293151 | 11/2007 |

OTHER PUBLICATIONS

Japanese Patent Application No. 2007-294720 Office Action, mailed Jan. 7, 2009 (English translation).

*Primary Examiner*—David Nelms
*Assistant Examiner*—Phu Vu
(74) *Attorney, Agent, or Firm*—Blakely, Sokoloff, Taylor & Zafman LLP

(57) ABSTRACT

According to one embodiment, a display device includes a display module and a stand having a tilt mechanism which adjusts an upright angle of the display module. The tilt mechanism includes a fixed portion provided on the stand, a movable portion provided on the display module, a hinge shaft which pivotably couples the fixed portion and the movable portion together, and a lock member which limits pivoting of the movable portion with respect to the fixed portion. The lock member is movable between a lock position where the lock member engages with the movable portion so as to prevent the display module from falling down through at least a predetermined angle and a release position where the lock member leaves the movable portion so as to allow the display module to pivot freely.

2 Claims, 9 Drawing Sheets

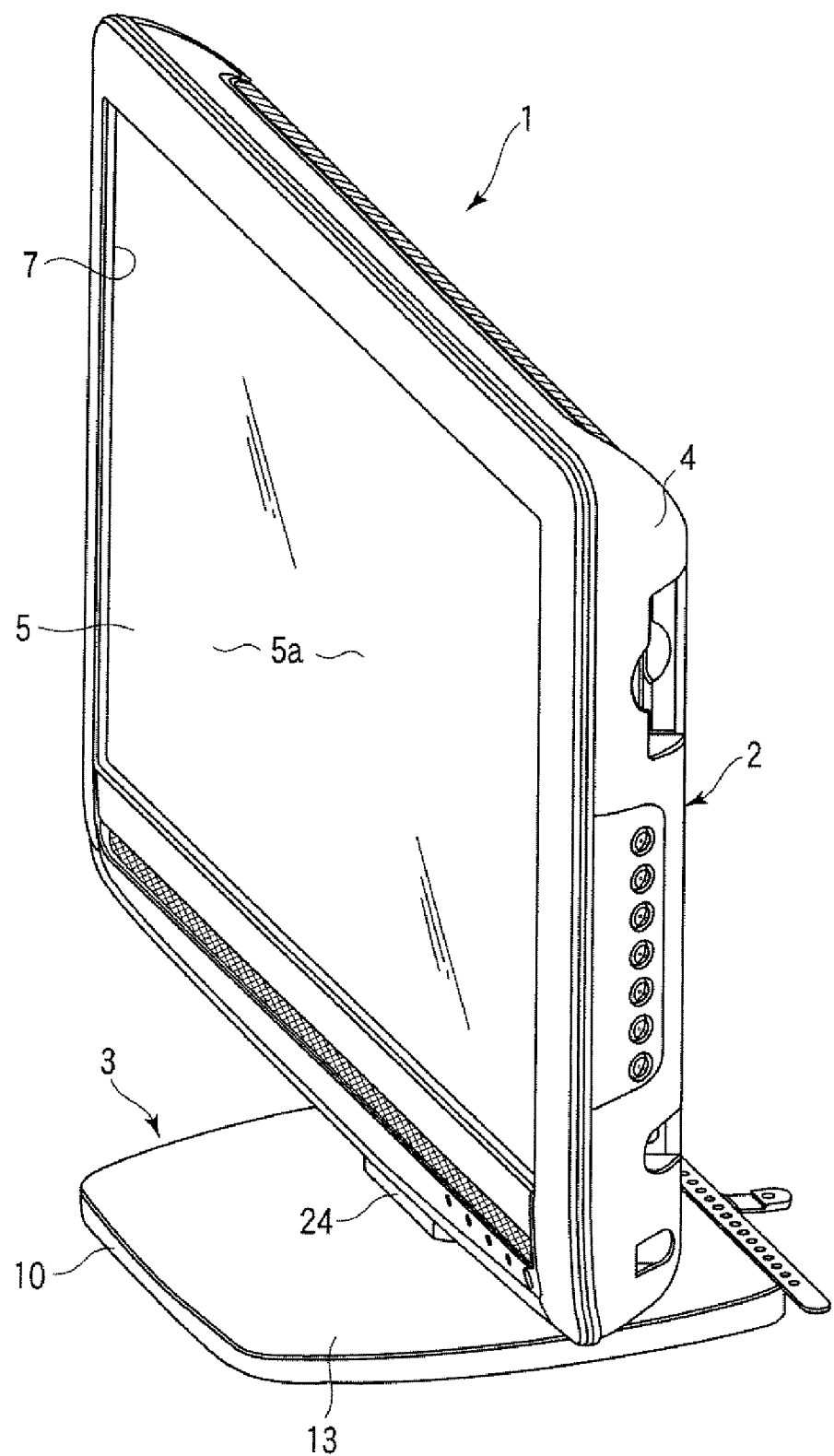
F I G. 1

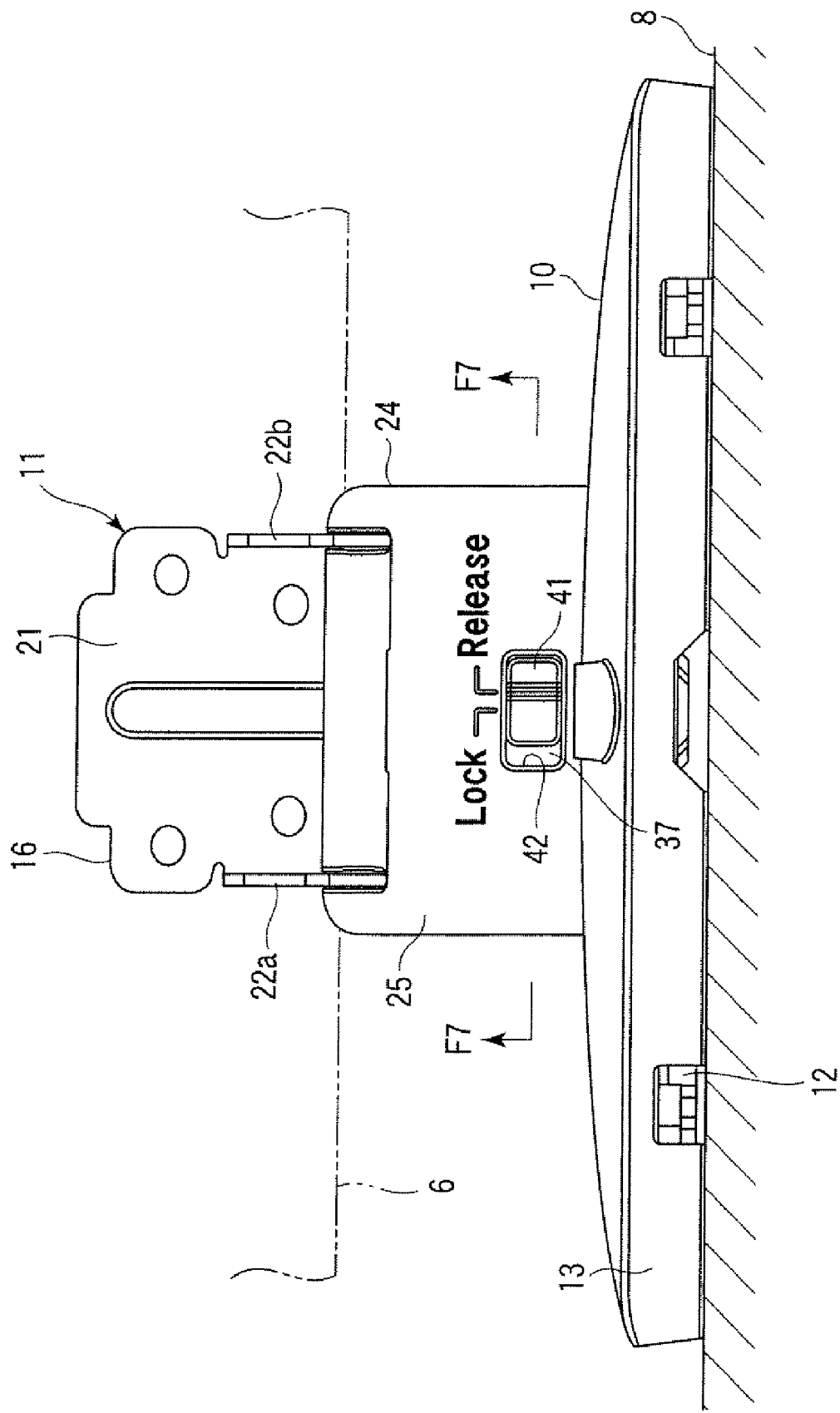
F I G. 6

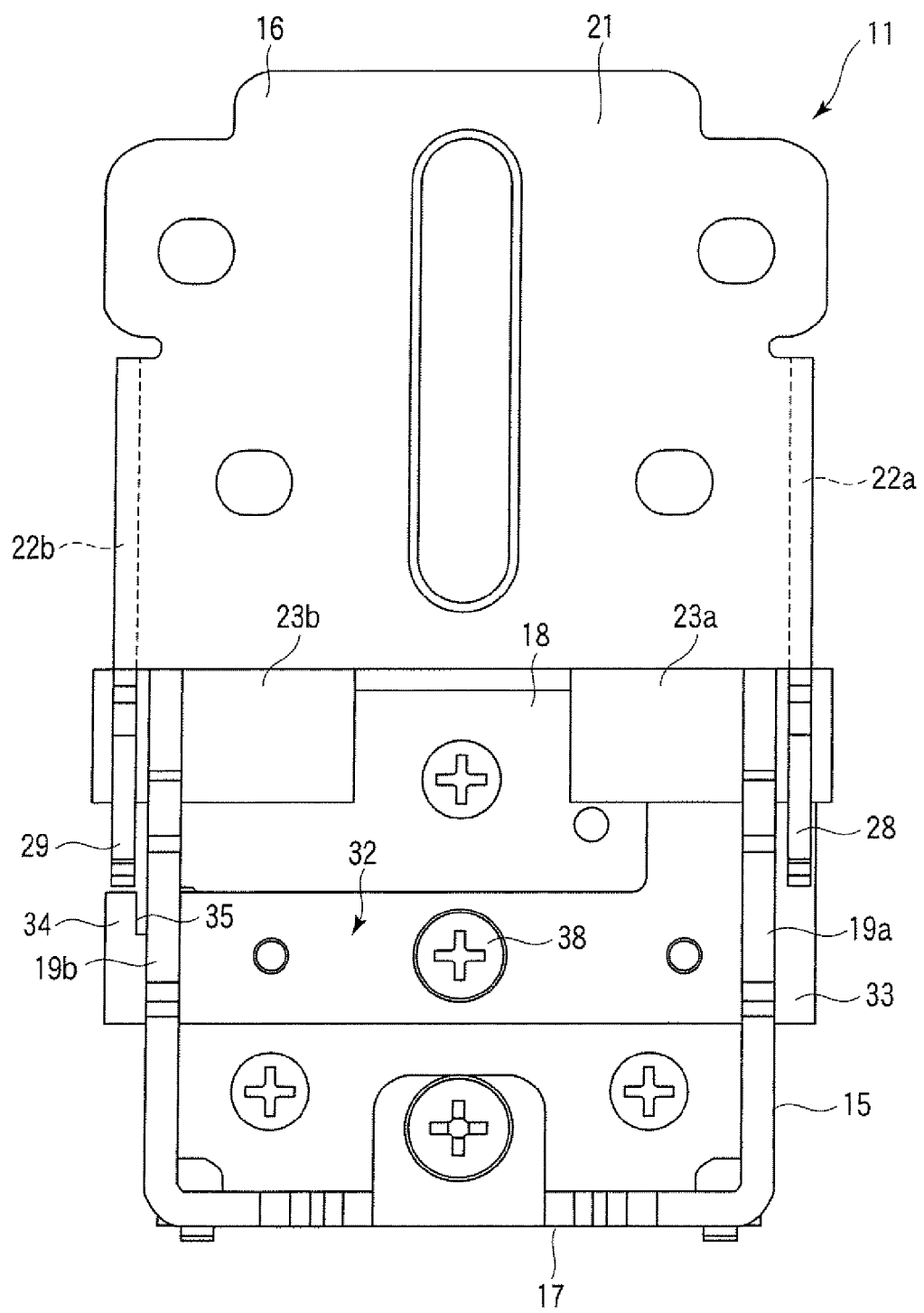
F I G. 9

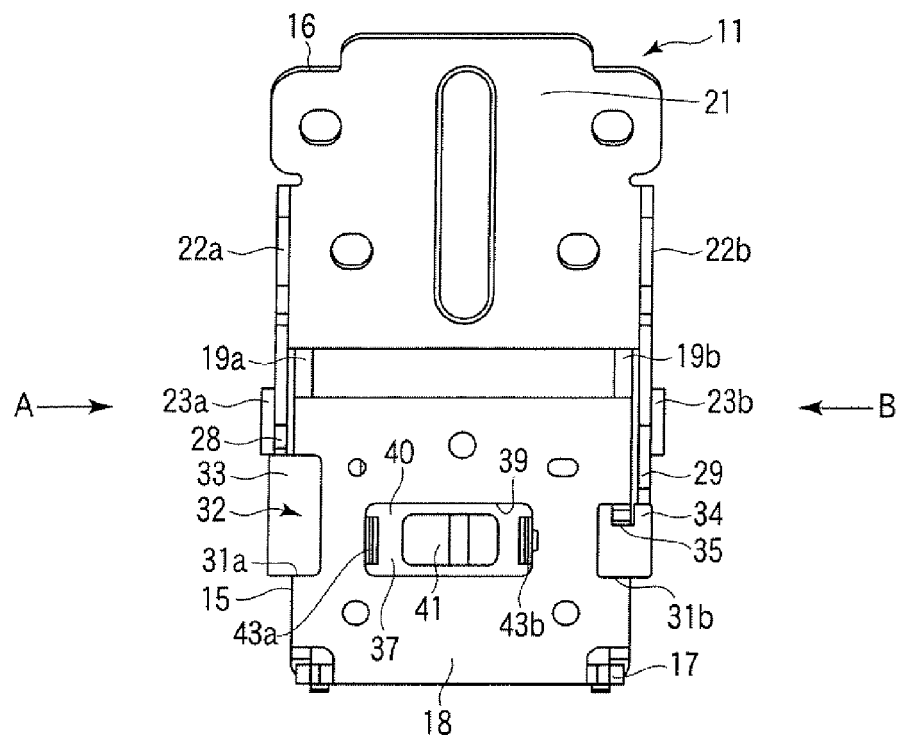
FIG. 10
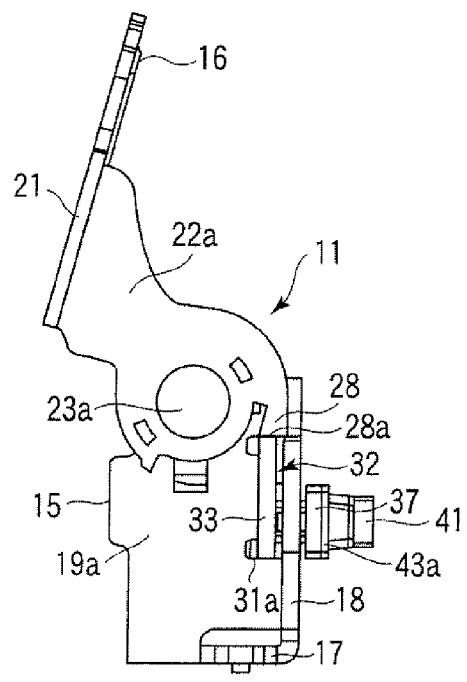 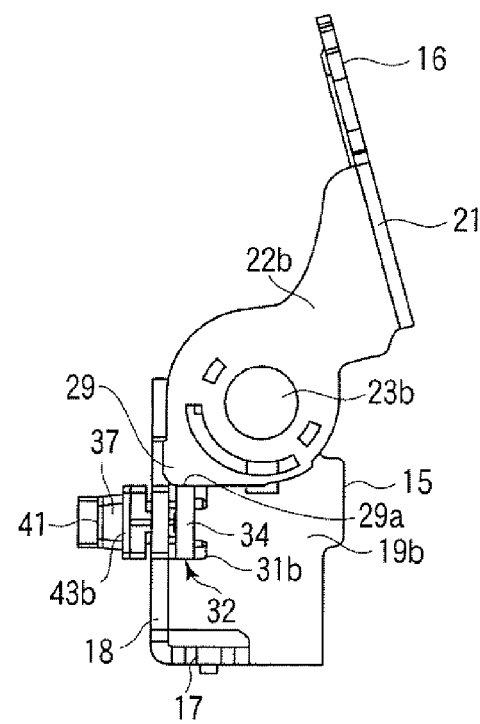
FIG. 11A  FIG. 11B

DISPLAY DEVICE AND DISPLAY DEVICE STAND

CROSS-REFERENCE TO RELATED APPLICATIONS

This application is based upon and claims the benefit of priority from Japanese Patent Application No. 2007-294720, filed Nov. 13, 2007, the entire contents of which are incorporated herein by reference.

BACKGROUND

1. Field

One embodiment of the invention relates to a thin display device such as a liquid crystal television which has a desk stand. Moreover, the present invention relates to the structure of a stand that supports a thin display module having, for example, a liquid crystal display panel.

2. Description of the Related Art

A display device such as a television or a computer monitor comprises a display module using, for example, a liquid crystal display panel. Such a display module has a significantly reduced thickness in order to improve the commercial value of the module; the depth dimension of the display module is formed to be extremely small compared to the width and height dimensions of the display module.

Thus, when the display module is installed on a television base or a desk, keeping the unitary display module upright is difficult. Thus, conventional display devices are equipped with a dedicated desk stand that supports the display module.

A desk stand disclosed in Jpn. Registered UM Publication No. 3130612 has a base placed on an installation surface such as a television base, and a leg portion that projects upward from the base. The leg portion is coupled to the base via a pivot shaft, for example, a bolt, and supports the display module.

The display module is pivotable around the pivot shaft through a predetermined angular range in a front-back direction of the base. The pivoting allows an operator to freely adjust the display module to an upright angle at which the operator can view a display screen of the liquid crystal display panel easily.

On the other hand, the desk stand is shaped to extend significantly forward and backward from the display module so as to be able to support the display module in a stable posture. Thus, for example, when the display device is placed in a box for packing, if the display module remains upright on the desk stand, the box in which the display device is accommodated unavoidably needs to be large.

Consequently, given that the display device is packed, the range of pivoting of the leg portion with respect to the base is desirably increased such that the display module can be brought down to a position where the display module is substantially parallel to the base of the desk stand.

However, while the display device is on the installation surface, when the display module is brought down along the installation surface to a position where the display module is substantially parallel to the installation surface, the display module projects forward or backward from the table stand.

As a result, the position of the center of gravity of the display module is significantly displaced from the desk stand. Thus, disadvantageously, the posture of the display device may be unstable, or the display device as a whole falls down on the installation surface.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary perspective view of a liquid crystal television according to an embodiment of the present invention;

FIG. 6 is an exemplary rear view of the stand according to the embodiment;

FIG. 9 is an exemplary front view of a tilt fitting according to the embodiment;

FIG. 10 is an exemplary rear view of the tilt fitting in which a lock plate is slid to a lock position according to the embodiment;

FIG. 11A is an exemplary side view of the tilt fitting as viewed from the direction of arrow A in FIG. 10;

FIG. 11B is an exemplary side view of the tilt fitting as viewed from the direction of arrow B in FIG. 10;

DETAILED DESCRIPTION

Various embodiments according to the invention will be described hereinafter with reference to the accompanying drawings. In general, according to one embodiment of the invention, a display device comprises a display module and a stand having a tilt mechanism that adjusts the upright angle of the display module. The tilt mechanism includes (1) a fixed portion provided on the stand, (2) a movable portion provided on the display module, (3) a hinge shaft pivotably coupling the fixed portion and the movable portion together, and (4) a lock member provided on the fixed portion to limit pivoting of the movable portion with respect to the fixed section. The lock member is movable between the lock position in which the lock member engages with the movable portion so as to prevent the display module from falling down through at least a predetermined angle and the release position in which the lock member leaves the movable portion so as to allow the display module to pivot freely.

Figure 2:
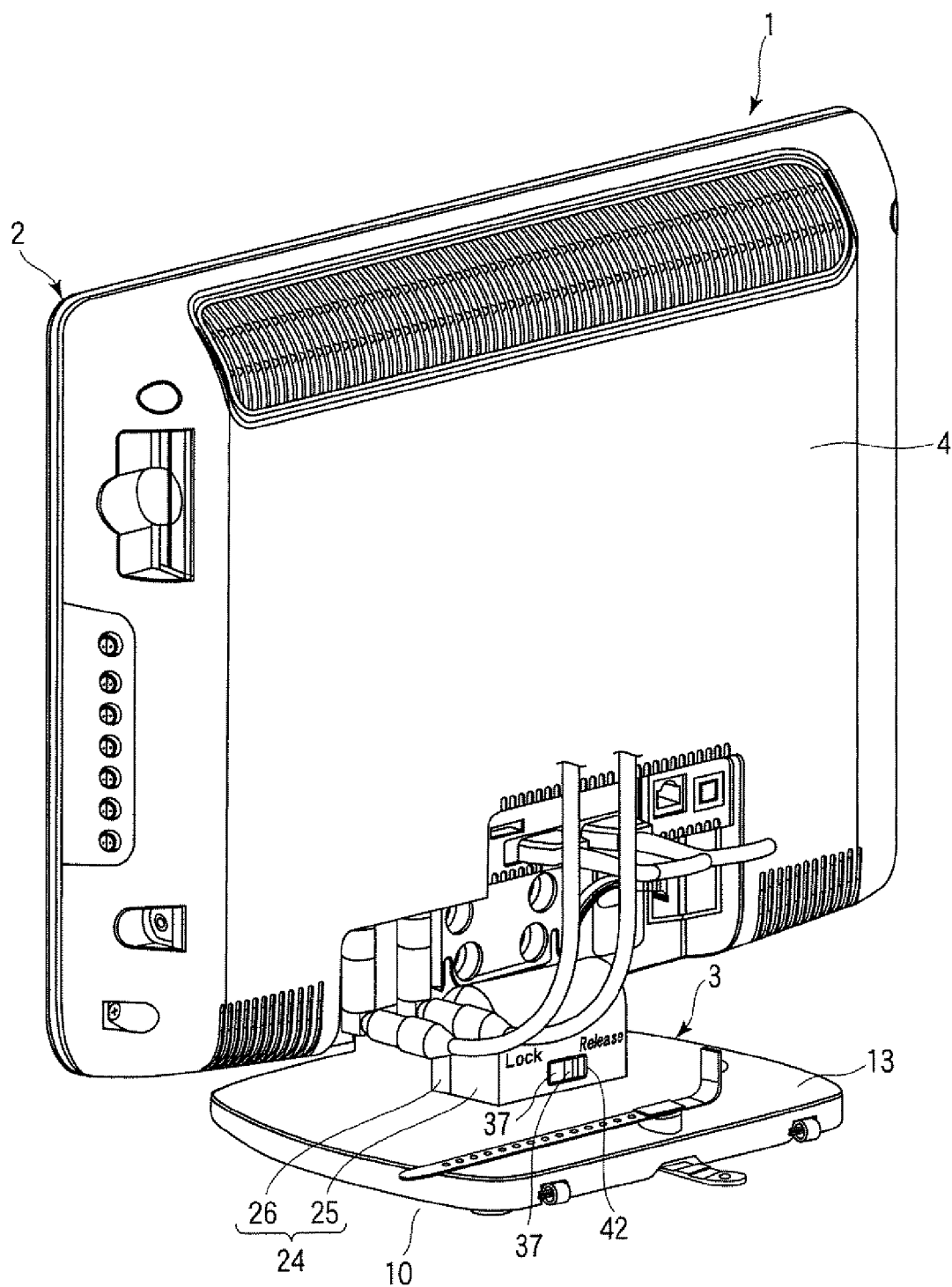
FIG. 2 is an exemplary perspective view of the liquid crystal television according to the embodiment as viewed from behind the television.

FIGS. 1 and 2 show a liquid crystal television 1 as an example of a display device. The liquid crystal television 1 comprises a display module 2 and a stand 3.

The display module 2 includes a housing 4 made of a synthetic resin and a flat liquid crystal display panel 5 accommodated inside the housing 4. The housing 4 has a significantly reduced thickness in order to improve the commercial value of the liquid crystal television 1; the depth dimension of the liquid crystal television 1 is extremely small compared to the width and height dimensions of the liquid crystal television 1.

The liquid crystal display panel 5 is supported on a metal chassis 6 schematically shown in FIG. 6. A display screen 5a of the liquid crystal display panel 5 is exposed from the display module 2 through an opening 7 in a front surface of the housing 4.

Figure 3:
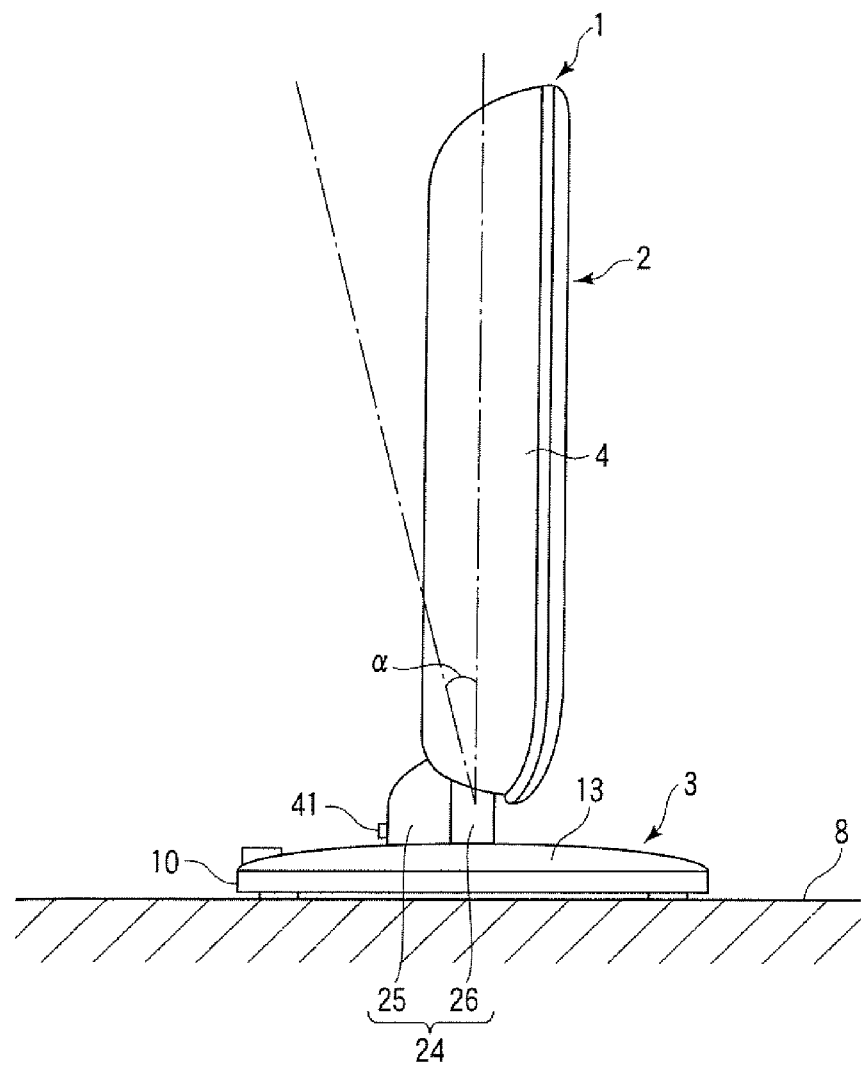
FIG. 3 is an exemplary side view of the liquid crystal television according to the embodiment wherein a display module has been pivotably moved to a use position.
Figure 5:
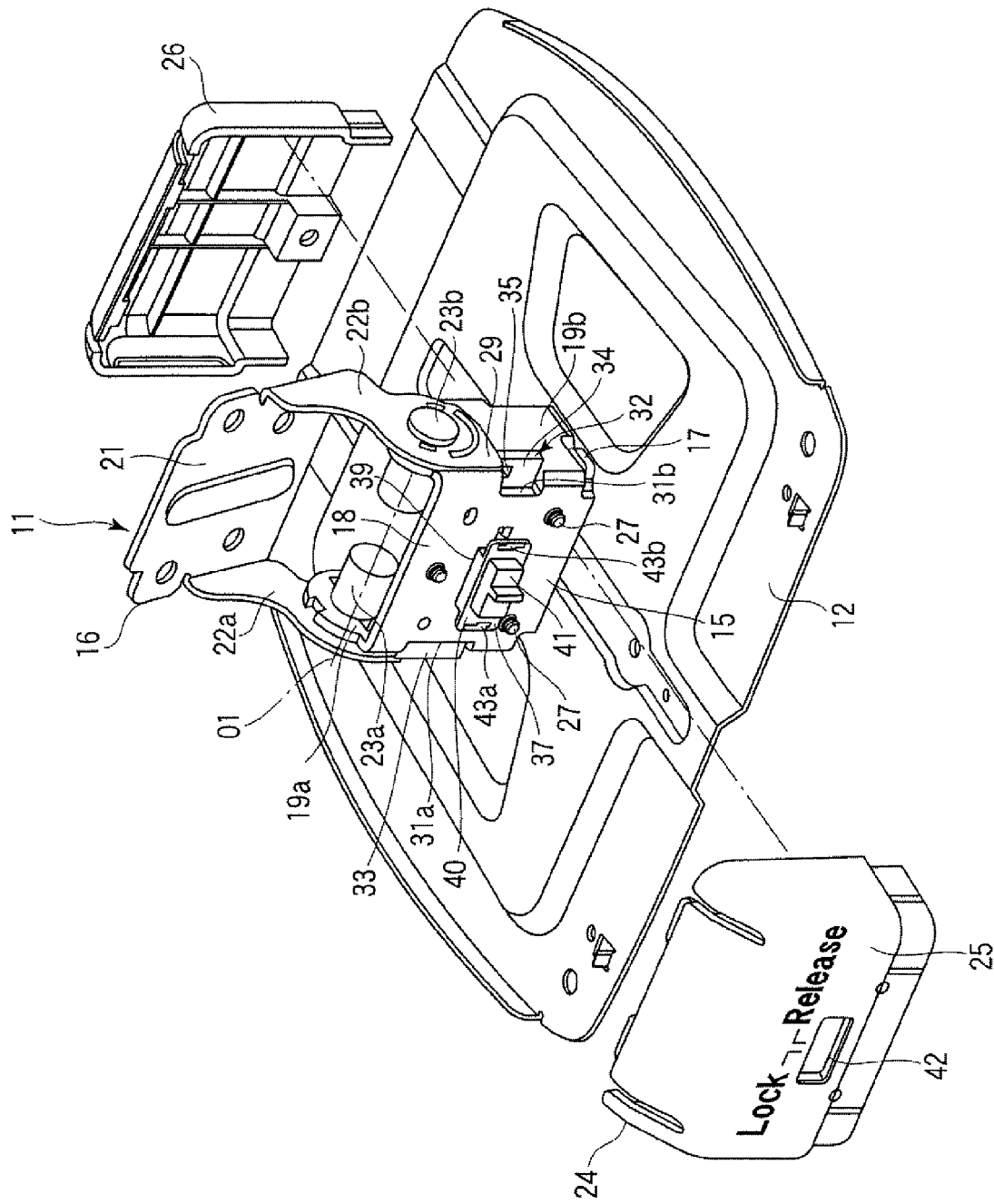
FIG. 5 is an exemplary perspective view of a stand according to the embodiment.

As shown in FIG. 3, a stand 3 supports the display module 2 on, for example, an installation surface 8 for a television base. The stand 3 comprises a base 10 and a tilt fitting 11. The base 10 is place on the installation surface 8. The base 10 is composed of a metal base frame 12 and a base cover 13 of a synthetic resin which covers the base frame 12. As shown in FIG. 5, the base frame 12 is shaped like a rectangular plate so as to allow the base 10 to be placed on the installation surface 8 in a stable posture. The base frame 12 has a much larger depth direction than the display module 2.

The tilt fitting 11 is an example of a tilt mechanism. As shown in FIG. 5, the tilt fitting 11 comprises a pillar 15 and a panel support fitting 16. The pillar 15 is an example of a fixed portion. The pillar 15 is fixed to a central portion of the base frame 12 via a plurality of screws. The pillar 15 protects upward from the base plate 12 and penetrates the base cover 13.

As shown in FIGS. 5, 9, and 10, the pillar 15 is an integral structure having a bottom plate 17, a back plate 18, and right side plate 19a and a left side plate 19b. The bottom plate 17 is fixed to a central portion of a top surface of the base frame 12 by a plurality of screws. The back plate 18 projects upward from a rear edge of the bottom plate 17. The side plates 19a and 19b project forward from lateral edges of the back plate 18. The side plates 19a and 19b are located opposite each other in a width direction of the base 10.

The panel support fitting 16 is an example of a movable portion. The panel support fitting 16 is an integral structure having a fitting main body 21 and a pair of leg portions 22a and 22b. The fitting main body 21 is shaped like a rectangular plate. The fitting main body 21 is fixed to a lower end of a central portion of the chassis 6 in a width direction of the chassis 6 via a plurality of screws. The fitting main body 21 is thus integrated with the display module 2. The leg portions 22a and 22b project from lateral edges of the fitting main body 21 toward the pillar 15. The leg portions 22a and 22b are located opposite each other in the width direction of the base 10.

As shown in FIGS. 5 and 9, the leg portions 22a and 22b of the panel support fitting 16 sandwich an upper part of the pillar 15. The leg portion 22a is pivotably coupled to an upper part of the side plate 19a via a first hinge shaft 23a. The leg portion 22b is pivotably coupled to an upper part of the side plate 19b via a second hinge shaft 23b. The first and second hinge shafts 23a and 23b each have a horizontal axis O1 and are coaxially arranged.

The panel support fitting 16, integrated with the display module 2, is supported on the pillar 15 via the first and second hinge shafts 23a and 23b, respectively. Thus, the display module 2 is pivotable around the first and second hinge shafts 23a and 23b between a use position and a storage position.

Figure 4:
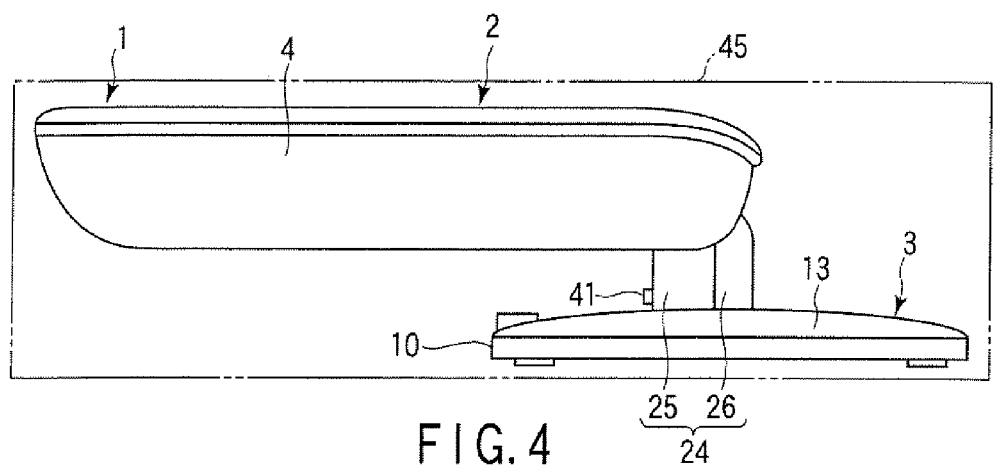
FIG. 4 is an exemplary side view of the liquid crystal television according to the embodiment wherein the display module has been pivotably moved to a storage position.

FIG. 3 shows that the display module 2 has been pivotably moved to the use position. In the use portion, the display module 2 lies upright substantially perpendicularly to the installation surface 8. FIG. 4 shows that the display module 2 has been pivotably moved to the storage position. In the storage position, the display module 2 is brought down toward the rear of the base 10 along the installation surface 8 to an angle close to a substantially horizontal direction.

In the present embodiment, the first and second hinge shafts 23a and 23b pivot together with the panel support fitting 16. Thus, the first and second hinge shafts 23a and 23b pivot relative to the side plates 19a and 19b of the pillar 15. A plurality of washers or coil springs (neither of the washers and coil springs are shown) are interposed between each of the hinge shaft 23a and 23b and the corresponding one of the side plates 19a and 19b to exert a frictional force. This limits free pivoting of the first and second hinge shafts 23a and 23b to hold the display module 2 at an optional pivoting angle.

The display module 2 pivotably moved to the use position is pivotable between a reference position where the display screen 5a of the display panel 5 stands perpendicularly to the installation surface 8 and an inclined position where the display screen 5a is brought down backward from the reference position. The operator can utilize the pivoting to adjust the upright angle of the display module 2 so as to view the display screen 5a easily. In the present embodiment, the adjustment range α of the upright angle of the display module 2 is set to, for example, 15°.

The pillar 15 of the tilt fitting 11 is covered with a decorative cover 24 of a synthetic resin. The decorative cover 24 is divided into a rear cover 25 and a front cover 26. The rear cover 25 is fixed to the back plate 18 of the pillar 15 via a plurality of screws 27. The front cover 26 is removably engaged with the rear cover 25 and cooperates with the rear cover 25 in surrounding the pillar 15.

Figure 13A:
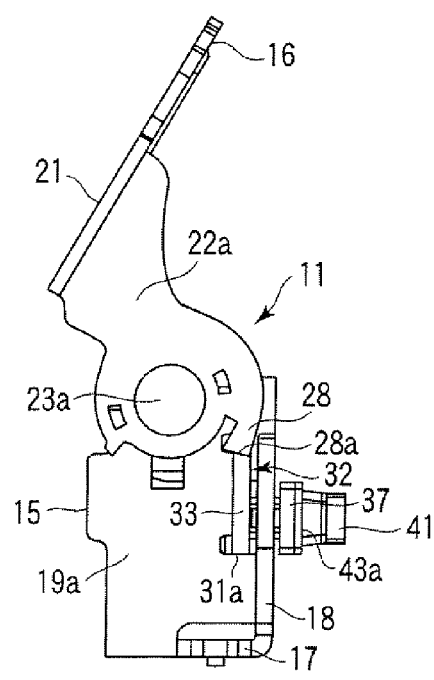
FIG. 13A is an exemplary side view of the tilt fitting as viewed from the direction of arrow A in FIG. 12.

As shown in FIGS. 11A and 13A, a first stopper portion 28 is formed on the leg portion 22a of the panel support fitting 16. The first stopper portion 28 is positioned at an outer periphery of a tip portion of the leg portion 22a. The first stopper portion 28 has an edge 28a extending from the outer periphery of the tip portion of the leg portion 22a toward the center of the first hinge shaft 23a.

Figure 13B:
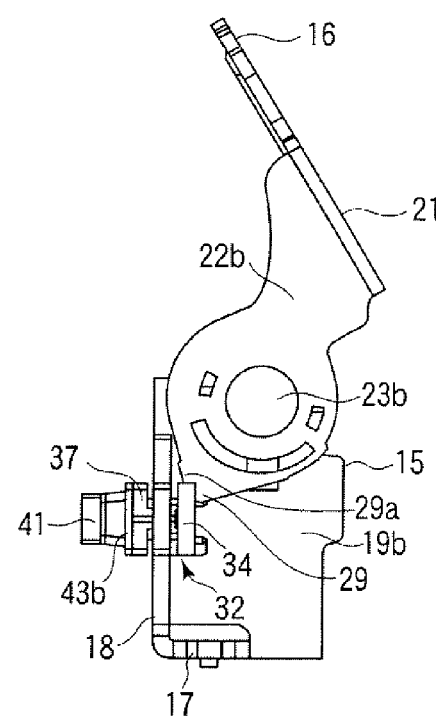
FIG. 13B is an exemplary side view of the tilt fitting as viewed from the direction of arrow B in FIG. 12.

As shown in FIGS. 11B and 13B, a second stopper portion 29 is formed on the leg portion 22b of the panel support fitting 16. The second stopper portion 29 projects from an outer periphery of a tip portion of the leg portion 22b toward a side opposite to the fitting main body 21. The second stopper portion 29 has an edge 29a that is tapered as the second stopper portion 29 approaches a projecting end.

Figure 7:
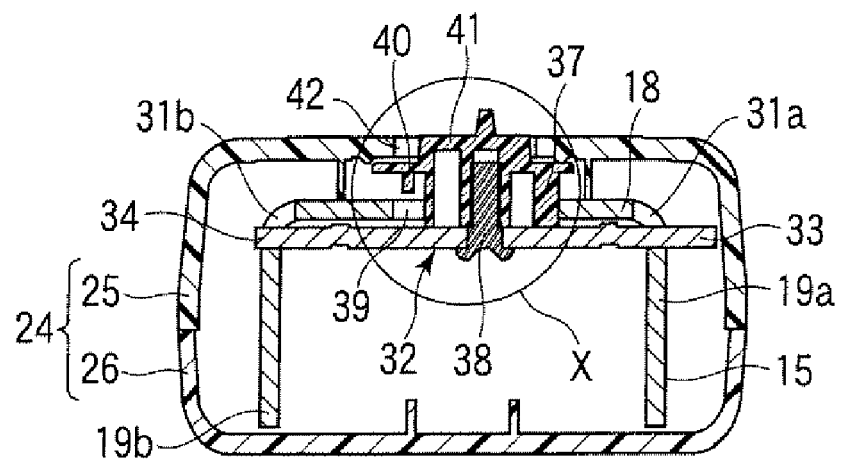
FIG. 7 is an exemplary sectional view taken along line F7-F7 in FIG. 6.

As shown in FIGS. 5, 7, and 10, the pillar 15 of the tilt fitting 11 has a pair of slit-like guide holes 31a and 31b. The guide hole 31a is formed in a corner portion defined by the back plate 18 and the side plate 19a. The guide hole 31b is formed in a corner portion defined by the back plate 18 and the side plate 19b.

As best shown in FIG. 7, a metal lock plate 32 is attached to the pillar 15 of the tilt fitting 11. The lock plate 32 is an example of a lock member. The lock plate 32 is shaped like a band extending in a width direction of the tilt fitting 11. The lock plate 32 has a length dimension extending between the guide holes 31a and 31b. The lock plate 32 is supported so as to be slidable between opening edges of the guide holes 31a and 31b and the back plate 18.

Figure 12:
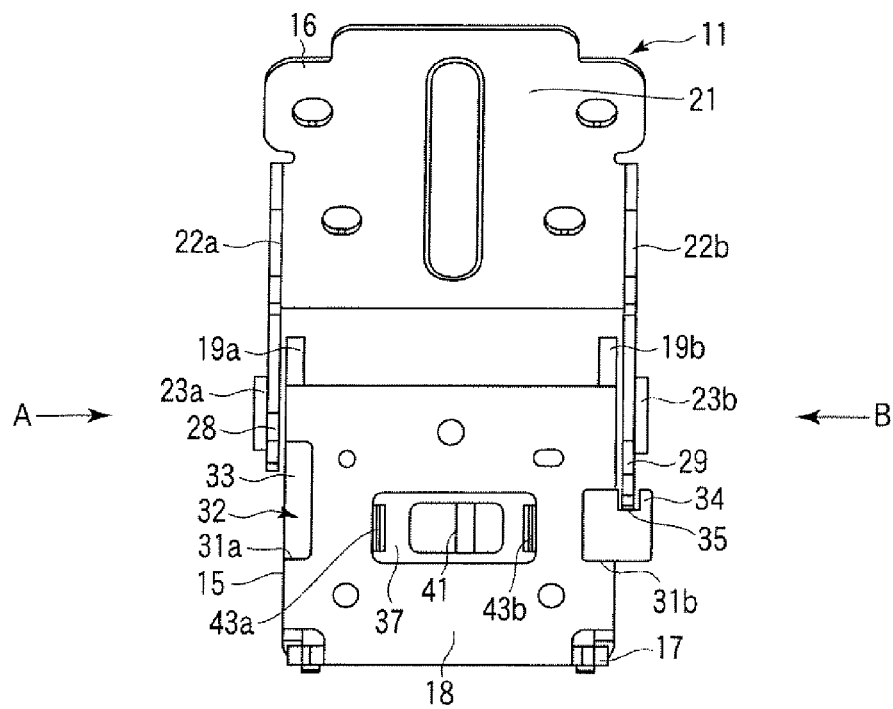
FIG. 12 is an exemplary rear view of the tilt fitting in which the lock plate is slid to a release position according to the embodiment.

The lock plate 32 has a first engaging portion 33 and a second engaging portion 34. The first engaging portion 33 is positioned at on end of the lock plate 32 in a longitudinal direction of the lock plate 32. The second engaging portion 34 is positioned at the other end of the lock plate 32 in the longitudinal direction of the lock plate 32. A recess portion 35 such as the one shown in FIGS. 10 and 12 is formed at the other end of the lock plate 32. The recess portion 35 is open at an upper edge of the lock plate 32 and located adjacent to the second engaging portion 34. The recess portion 35 has such a size as avoids the second stopper portion 29 of the panel support fitting 16.

The lock plate 32 is slidable in the width direction of the tilt fitting 11 between a lock position and a release position. FIGS. 10 and 11 show that the lock plate 32 has been moved to the lock position. In the lock position, the first engaging portion 33 of the lock plate 32 extends sideward from the side plate 19a of the pillar 15. Thus, the first engaging portion 33 extends downward from the tip portion of the leg portion 22a so as to cross a pivoting track of the tip portion of the leg portion 22a of the panel support fitting 16. Moreover, in the lock position, the second engaging portion 34 of the lock plate 32 extends sideward from the side plate 19b of the pillar 15. The second engaging portion 34 extends downward from the tip portion of the leg portion 22b so as to cross a pivoting track of the tip portion of the leg portion 22b of the panel support fitting 16.

FIGS. 12 and 13 show that the lock plate 32 has been moved to the release position. In the release position, the first engaging portion 33 of the lock plate 32 is retracted into the guide hole 31a and deviates from the pivoting track of the tip portion of the leg portion 22a of the panel support fitting 16. Moreover, in the release position, recess portion 35 of the lock plate 32 extends sideward from the side plate 19b of the pillar 15 and is positioned on the pivoting track of the tip portion of the leg portion 22b of the panel support fitting 16. The second engaging portion 34 of the lock plate 32 concurrently deviates from the pivoting track of the tip portion of the leg portion 22b.

Figure 8:
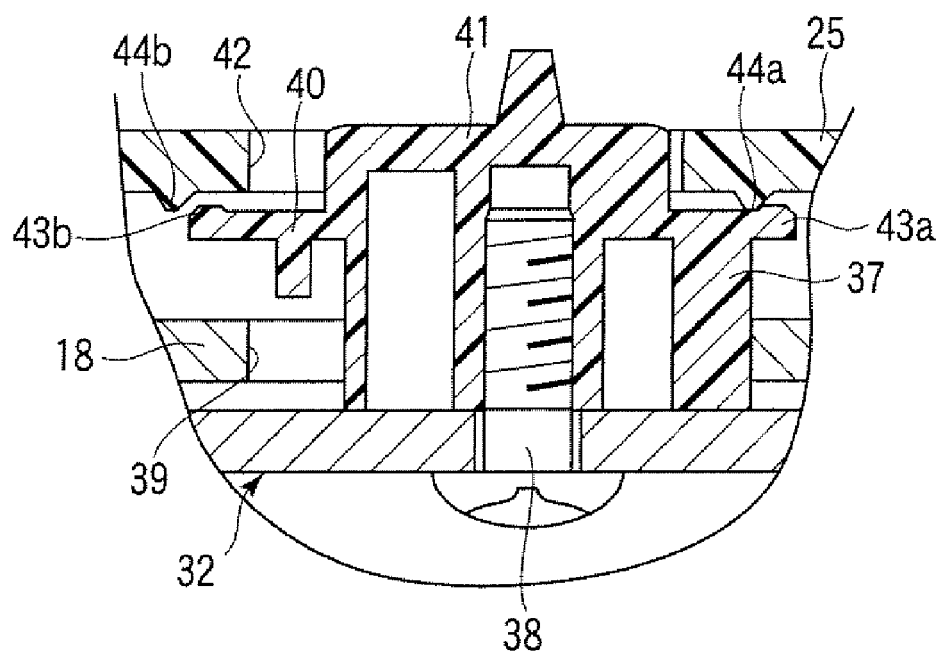
FIG. 8 is an exemplary enlarged sectional view of a portion X of FIG. 7.

As shown in FIGS. 7 and 8, an operation lever 37 of a synthetic resin is fixed to a central portion of a back surface of the lock plate 32 by a screw 38. The operation lever 37 projects backward from the pillar 15 through a through-hole 39 formed in the back plate 18. The operation lever 37 has a wall portion 40 positioned behind the pillar 15. The wall portion 40 is shaped like a rectangle extending in a slide direction of the lock plate 32. A protruding portion 41 is formed on the wall portion 40 so that the fingertip can be placed on the protruding portion 41. The protruding portion 41 is exposed toward the rear of the stand 3 through a rectangular opening 42 formed in the rear cover 25.

The lock plate 32 can be moved to either the lock position or the release position by pressing the protruding portion 41 of the operation lever 37 by the fingertip. A rear surface of the rear cover 25 has a lock mark indicating that the lock plate 32 has been slid to the lock position and a release mark indicating that the lock plate 32 has been slid to the release position.

As shown in FIGS. 7 and 8, a rear surface of the wall portion 40 of the operation lever 37 is located opposite the rear cover 25. Two engaging projections, 43a and 43b, are formed on the rear surface of the wall portion 40. The engaging projection 43a is positioned at one end of the wall portion 40 in a longitudinal direction of the wall portion 40. The engaging projection 43b is positioned at the other end of the wall portion 40 in the longitudinal direction of the wall portion 40.

Two pawls, 44a and 44b, are formed on an inner surface of the rear cover 25. The pawls 44a and 44b are separately arranged across the opening 42 in the sliding direction of the lock plate 32.

When the lock plate 32 is slid to the lock position, the engaging portion 43a is elastically caught on the pawl 44a. Thus, the lock plate 32 is held in the lock position. Furthermore, when the engaging projection 43a climbs over the pawl 44a, this can be sensed by the operator. Thus, the operator operating the operation lever 37 can recognize that the lock plate 32 has been slid to the lock position.

Similarly, when the lock plate 32 slid from the lock position to the release position, the engaging projection 43a leaves the pawl 44a, and the engaging projection 43b is elastically caught on the pawl 44b. As a result, the lock plate 32 is held in the release position. Furthermore, when the engaging projections 43a and 43b climb over the pawls 44a and 44b, this can be sensed by the operator. Thus, the operator operating the operation lever 37 can recognize that the lock plate 32 has been slid from the lock position to the release position.

Thus, in the present embodiment, the engaging projections 43a and 43b and the pawls 44a and 44b constitute a holding means for holding the lock plate 32 in the lock position and in the release position.

With this configuration, when the liquid crystal television 1 is installed on the installation surface 8 to allow programs to be viewed, the display module 2 is pivotably moved to the use position to stand the display screen 5a of the liquid crystal display panel 5 upright.

With the display module 2 pivotably moved to the use position, the operator presses the protruding portion 41 of the operation lever 37 by fingertip to align the tip of the protruding portion 41 with the position of the lock mark. Thus, the lock plate 32 slides to the lock position.

In the lock position, shown in FIGS. 10, 11A, and 11B, the first engaging portion 33 of the lock plate 32 advances so as to traverse the pivoting track of the leg portion 22a of the panel support fitting 16. Moreover, the recess portion 35 of the lock plate 32 deviates from the pivoting track of the leg portion 22b. The second engaging portion 34 of the lock plate 32 advances so as to traverse the pivoting track of the leg portion 32b.

As a result, when the display module 2 is pivotably moved toward the storage position so as to incline the display module 2 through more than 15° with respect to the posture in which the display module 2 stands upright in the vertical direction, the edge 28a of the first stopper portion 28 of the leg portion 22a abuts against the first engaging portion 33 of the lock plate 32. The edge 29a of the second stopper portion 29 of the leg portion 22*b* concurrently abuts against the second engaging portion 34 of the lock plate 32.

Consequently, the pivoting of the display module 2 is limited, and the display module 2 is held so as to avoid tilting through at least 15° with respect to the posture in which the display module 2 stands upright in the vertical direction.

On the other hand, for example, to place the liquid crystal television 1 in a box 45 such as the one shown in FIG. 4 for packing, the operator presses the protruding portion 41 of the operation lever 37 to align the tip of the protruding portion 41 with the release mark. The lock plate 32 thus slides to the release position.

In the release position, shown in FIGS. 12, 13A, and 13B, the first engaging portion 33 of the lock plate 32 deviates from the pivoting track of the leg portion 22*a* of the panel support fitting 16. The recess portion 35 of the lock plate 32 advances onto the pivoting track of the leg portion 22*b*.

Thus, even when the display module 2 is pivotably moved from the use position toward the storage position so as to incline the display module 2 through more than 15°, the engagement between the leg portion 22*a* of the panel support fitting 16 and the first engaging portion 33 of the lock plate 32 is avoided. The leg portion 22*b* of the panel support fitting 16 correspondingly passes through the recess portion 35 of the lock plate 32 without abutting against the second engaging portion 34 of the lock plate 32.

Consequently, the display module 2 can be pivotably moved toward the storage position. Furthermore, as shown in FIG. 4, the display module 2 can be folded along the base 10 of the stand 3. Therefore, the box 45 in which the liquid crystal television 1 is accommodated can be formed to be as compact as possible. This enables a reduction in the space in which the liquid crystal television 1 is stored.

According to the embodiment, moving the lock plate 32 to the lock or release position allows the pivoting angle of the display module 2 to be optionally changed depending on the use status of the display module 2.

Consequently, while the liquid crystal television 1 is placed on the installation surface 8 for use, the display module 2 cannot be brought down to the storage position unless the lock plate 32 is slid to the release position. Therefore, the liquid crystal television 1 can be reliably prevented from falling down.

Moreover, in the present embodiment, the operation lever 37, used to operate the lock plate 32, is positioned behind the pillar 15. Thus, when the liquid crystal television 1 is placed on the installation surface 8 so as to allow programs to be viewed, the viewer does not see the operation lever 37. Thus, the aesthetic appearance of the liquid crystal television 1 can be appropriately maintained.

The present invention is not limited to the above-described embodiment. Various changes may be made to the embodiment without departing from the spirit of the present invention.

For example, the display device according to the present invention is not limited to the liquid crystal television but may be a plasma television or a computer monitor.

While certain embodiments of the inventions have been described, the embodiments have been presented by way of example only, and are not intended to limit the scope of the invention. Indeed, the novel methods and systems described herein may be embodied in a variety of other forms; furthermore various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display device comprising:
 a display module having a display screen; and
 a stand including a tilt mechanism, the tilt mechanism coupling the stand to the display module such that the display module can pivot, to adjust an upright angle of the display screen;
 wherein:
  the tilt mechanism includes:
   a fixed portion provided on the stand and having side plates opposing each other;
   a movable portion provided on the display module and having a pair of leg portions opposing each other with the fixed portion interposed therebetween;
   hinge shafts which couple the side plates of the fixed portion to the leg portions of the movable portion such that the movable portion can pivot;
   a lock member which limits pivoting of the movable portion with respect to the fixed portion, the lock member having a length which permits the lock member to extend between the side plates of the fixed portion, the lock member being provided on the fixed portion such that the lock member can slide between a lock position and a release position;
   a lever provided behind the stand, the lever being manually driven to slide the lock member to the lock position or the release position; and
   holding means for holding the lock member in the lock position and the release position,
  the lock member includes a first engaging portion located at one end in a longitudinal direction of the lock member, a second engaging portion located at another end in the longitudinal direction of the lock member, and a recess portion located adjacent to the second engaging portion,
  in the lock position, the first and second engaging portions protrude laterally with respect to the side plates to cross pivoting tracks drawn by tips of the leg portions of the movable portion, and the first and second engaging portions are engaged with the leg portions of the movable portion such that the display module does not tilt through a predetermined angle or more;
  in the release position, the first engaging portion is displaced from the pivoting track drawn by the tip of one of the leg portions, and the recess portion is positioned on the pivoting track drawn by the tip of the other leg portion to permit passing of the other leg portion, thereby permitting free pivoting of the display module; and
  the display module can pivot within a predetermined angular range to adjust the upright angle of the display screen when the lock member is slid to the lock position.

2. A display device stand comprising:
 a fixed portion fixed to a base placed on an installation surface, the fixed portion has side plates opposing each other;

a movable portion fixed to a display module and including a pair of leg portions opposing each other with the fixed portion interposed therebetween;

hinge shafts coupling the side plates of the fixed portion and the leg portions of the movable portion such that the movable portion can pivot;

a lock member which limits pivoting of the movable portion with respect to the fixed portion, the lock member having a length which permits the lock member to extend between the side plates of the fixed portion, the lock member being provided on the fixed portion such that the lock member can slide between a lock position and a release position;

a lever provided behind the stand, the lever being manually driven to slide the lock member to the lock position or the release position; and holding means for holding the lock member in the lock position and the release position, wherein:

the lock member includes a first engaging portion located at one end in a longitudinal direction of the lock member, a second engaging portion located at another end in the longitudinal direction of the lock member, and a recess portion located adjacent to the second engaging portion;

in the lock position, the first and second engaging portions protrude laterally with respect to the side plates to cross pivoting tracks drawn by tips of the leg portions of the movable portion, and the first and second engaging portions are engaged with the leg portions of the movable portion such that the display module does not tilt through a predetermined angle or more;

in the release position, the first engaging portion is displaced from the pivoting track drawn by the tip of one of the leg portions, and the recess portion is positioned on the pivoting track drawn by the tip of the other leg portion to permit passing of the other leg portion, thereby permitting free pivoting of the display module; and the display module can pivot within a predetermined angular range to adjust the upright angle of the display screen when the lock member is slid to the lock position.

* * * * *